(12) United States Patent
Okuhira

(10) Patent No.: US 6,271,333 B1
(45) Date of Patent: Aug. 7, 2001

(54) ONE-PART MOISTURE CURABLE COMPOSITION

(75) Inventor: Hiroyuki Okuhira, Kanagawa Prefecture (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/553,946

(22) Filed: Apr. 21, 2000

(30) Foreign Application Priority Data

Apr. 22, 1999 (JP) .................................................. 11-115050
Jun. 8, 1999 (JP) .................................................. 11-161322

(51) Int. Cl.$^7$ .................................................. C08G 77/00
(52) U.S. Cl. .............................. 528/28; 528/25; 528/901; 525/453
(58) Field of Search .............................. 528/25, 28, 901; 525/453

(56) References Cited

U.S. PATENT DOCUMENTS

| 4,507,443 | 3/1985 | Barron et al. . |
| 5,068,304 | 11/1991 | Higuchi et al. . |
| 5,684,094 | * 11/1997 | Suzuki et al. . |

FOREIGN PATENT DOCUMENTS

| 0 504 630 A2 | 9/1992 | (EP) . |
| 0890 594 A1 | 1/1999 | (EP) . |
| 45-36319 | 11/1970 | (JP) . |
| 46-12154 | 3/1971 | (JP) . |
| 50-156599 | 12/1975 | (JP) . |
| 51-73561 | 6/1976 | (JP) . |
| 54-006096A | 1/1979 | (JP) . |
| 54-006097A | 1/1979 | (JP) . |
| 55-082123A | 6/1980 | (JP) . |
| 55-123620A | 9/1980 | (JP) . |
| 55-125121A | 9/1980 | (JP) . |
| 55-131022A | 10/1980 | (JP) . |
| 55-135135A | 10/1980 | (JP) . |
| 55-137129A | 10/1980 | (JP) . |
| 59-078223A | 5/1984 | (JP) . |
| 60-228516A | 11/1985 | (JP) . |
| 60-228517A | 11/1985 | (JP) . |
| 03043449A | 2/1991 | (JP) . |
| 03047825A | 2/1991 | (JP) . |
| 03072527A | 3/1991 | (JP) . |
| 0309627A | 4/1991 | (JP) . |
| 09263708A | 10/1997 | (JP) . |
| 11-35189 | * 2/1999 | (JP) . |

OTHER PUBLICATIONS

Chemical Abstract, vol. 117, No. 24, Dec. 14, 2992, Abstract No. 235658, XP–002143326.

* cited by examiner

*Primary Examiner*—Robert Dawson
*Assistant Examiner*—Marc S. Zimmer
(74) *Attorney, Agent, or Firm*—Arent Fox Kintner Plotkin & Kahn, PLLC

(57) ABSTRACT

A room temperature-curable one-part moisture curable composition exhibiting excellent storage stability as well as good adhesion is provided. The cured product produced therfrom has excellent rubber elasticity as well as high strength. The one-part moisture curable composition comprises (A) an organic polymer having at least one reactive silyl group in the molecule, (B) an isocyanate compound having at least one isocyanate (NCO) group bonded to secondary or tertiary carbon in the molecule, and (C) a latent curing agent. The latent curing agent (C) is preferably a ketimine wherein a branched carbon atom or a ring member carbon atom is bonded to α position of at least one of the ketimine carbon or the ketimine nitrogen.

2 Claims, No Drawings

ONE-PART MOISTURE CURABLE COMPOSITION

BACKGROUND OF THE INVENTION

This invention relates to a one-part moisture curable composition which exhibits excellent storage stability as well as room temperature-curable good adhesion and excellent sheet property in rubber elasticity and strength.

Organic polymers having a reactive silyl group, namely, modified silicone resins have become a versatile resin for use as a sealant having well balanced properties in coating and sealing applications since such polymers are room temperature-curable and the cured products thereof exhibit rubber elasticity owing to their polyether backbone and the like.

However, modified silicone resin has low strength inherently, therefore, modified silicone resin with excellent strength is desired.

In view of such situation, various curable compositions comprising a curable compound capable of imparting the modified silicone resin with strength have been proposed. Examples of such compound are epoxy compounds and isocyanate compounds.

However, when a one-part composition is produced from a modified silicone resin and an isocyanate compound, the isocyanate compound suffers from curing failure due to the blocking of the isocyanate group by the alcohol generated in the curing of the modified silicone resin. When an amine or the like is used for the curing agent of the isocyanate compound, and the isocyanate compound and the amine are stored as a mixture, the mixture undergoes gelation, curing, and the like during its storage and the mixture was not at all storage stable. Even if a latent curing agent having the amine blocked were used, the mixture still suffered from insufficient storage stability.

SUMMARY OF THE INVENTION

The present invention has been completed in view of the prior art technology as described above, and an object of the present invention is to provide a room temperature-curable one-part moisture curable composition which has excellent storage stability, and which can be cured into a cured product exhibiting excellent adhesion, rubber elasticity, and strength.

In the present invention, such object is realized by using the isocyanate compound of particular structure and the latent curing agent of particular structure in the preparation of the one-part moisture curable composition from an organic polymer having a reactive silyl group, an isocyanate compound, and a latent curing agent. Accordingly, the one-part moisture curable composition of the present invention comprises:

(A) an organic polymer having at least one reactive silyl group in the molecule, (B) an isocyanate compound having at least one isocyanate (NCO) group bonded to secondary or tertiary carbon in the molecule, and (C) a latent curing agent.

The latent curing agent (C) is preferably a ketimine having ketimine (C=N) bond derived from a ketone or an aldehyde and an amine, having a structure wherein a branched carbon atom or a ring member carbon atom is bonded to α position of at least one of carbon or nitrogen of the ketimine bond.

DETAILED DESCRIPTION OF THE INVENTION

The present invention is hereinafter described in further detail.

The one-part moisture curable composition of the present invention comprises:

(A) an organic polymer having at least one reactive silyl group in the molecule, (B) an isocyanate compound having a particular structure as described below, and (C) a latent curing agent.

First, such components contained in the moisture curable composition of the present invention are described.

(A) Organic polymer having at least one reactive silyl group in the molecule

In the present invention, the organic polymer (A) used is the one containing at least one reactive silyl group in the molecule. The term, reactive silyl group used herein designates silanol group or silicon having a hydrolyzable group bonded thereto, and the reactive silyl group undergoes condensation reaction in the presence of moisture or cross-linking agent, and in optional presence of a catalyst.

Typical hydrolyzable groups bonded to the silicon include halogen atom, alkoxy group, acyloxy group, ketoxime group, alkenyloxy group, and the like. Among these, the most preferred is the alkoxy group.

The backbone preferably comprise a rubber-based organic polymer, and examples of such organic polymer include polyether, polyester, ether-ester block copolymer, olefin, and/or conjugated diene rubber, hydrogenate thereof, polychloroprene and other halogenated rubbers, styrene-acrylonitrile copolymer, styrene-acrylonitrile-butadiene copolymer, poly(meth)acrylate, and polysulfide-based polymer.

The polyether as mentioned above is preferably an alkylene oxide polymer containing an —RO— group wherein the divalent organic group R is a hydrocarbon group substantially containing 1 to 20 carbon atoms, and preferably 1 to 8 carbon atoms. R is typically methylene, ethylene, propylene, butylene, or tetramethylene, and most preferably, propylene. R may comprise either one of these or a combination of two or more of these.

The polyester as mentioned above is typically a polyester-based polymer obtained by condensation of a dibasic acid such as adipic acid or maleic anhydride and a glycol, or ring-opening polymerization of a cyclic ester such as a lactone.

The olefin and/or the conjugated diene rubber as mentioned above is typically polyisobutylene, polybutadiene, polyisoprene, isobutylene-isoprene copolymer, isoprene-butadiene copolymer, and a copolymer containing butadiene or isoprene.

Exemplary organic polymers (A) containing the reactive silyl group include those produced by the method proposed in JP-B 45-36319, JP-B 46-12154, JP-B 49-82673, JP-A 50-156599, JP-A 51-73561, JP-A 54-6096, JP-A 55-82123, JP-A 55-123620, JP-A 55-125121, JP-A 55-131022, JP-A 55-135135, JP-A 55-137129, and the like, and those produced by the method proposed in JP-A 3-47825, JP-A 3-72527, JP-A 3-43449, JP-A 3-79627, and the like.

Among those described above, the organic polymer (A) is preferably the one containing a polyether, a polyester, an ether-ester block copolymer, and the like as its backbone, and most preferably, the one containing a polyether backbone as its backbone. The backbone is not limited for its molecular weight. The molecular weight of the polyether, the polyester, or the ether-ester block copolymer is preferably about 300 to about 30000, and more preferably, about 500 to about 15000.

The organic polymer (A) preferably used in the present invention is described in further detail.

The organic polymer (A) containing a polyether for its backbone, and at least one reactive silyl group may be produced, for example, by the addition reaction between a silane compound represented by the following general formula (a) and a polyether containing a group represented by the general formula (b) having ethylenic double bond.

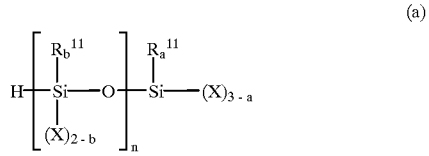

(a)

In formula (a), X is hydroxyl group or the hydrolyzable group as described above; $R^{11}$ is a monovalent hydrocarbon group containing 1 to 20 carbon atoms or a triorganosiloxy group represented by the formula: $(R^{12})_3SiO—$; the two or more $R^{11}$ may be either the same or different from each other; and n is an integer of 0 or more. The monovalent hydrocarbon group of $R^{11}$ may be selected from an alkyl group such as methyl and ethyl; a cycloalkyl group such as cyclohexyl; an aryl group such as phenyl group; and an aralkyl group such as benzyl group. $R^{12}$ may be a hydrocarbon group containing 1 to 20 carbon atoms as described above and when two or more $R^{12}$ are present, they may be either the same or different from each other.

Examples of the silane compound represented by the formula (a) include halogenated silanes such as trichlorosilane, methyldichlorosilane, dimethylchlorosilane, trimethylsiloxydichlorosilane, etc; alkoxysilanes such as trimethoxysilane, triethoxysilane, methyldimethoxysilane, phenyldimethoxysilane, 1,3,3,5,5,7,7-heptamethyl-1,1-dimethoxytetrasiloxane, etc.; acyloxysilanes such as methyldiacetoxysilane, trimethylsiloxymethylacetoxysilane, etc.; ketoxymate silanes such as bis(dimethylketoxymate) methylsilane, bis(cyclohexylketoxymate) methylsilane, bis(diethylketoxymate) trimethylsiloxysilane, etc.; hydrosilanes such as dimethylsilane, trimethylsiloxy-methylsilane, 1,1-dimethyl-2,2-dimethyldisiloxane, etc.; and alkenyl oxysilanes such as methyltri(isopropenyloxy)silane. The silane compound is not limited to those exemplified above.

The poylether which is reacted with the silane compound (a) contains a group having ethylenic double bond represented by formula (b):

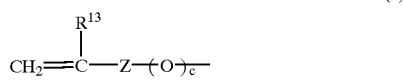

(b)

wherein $R^{13}$ is preferably hydrogen atom or a hydrocarbon group, and most preferably hydrogen atom; and Z is a divalent group containing a divalent hydrocarbon group, ether bond, ester bond, urethane bond, carbonate bond, or carbonyl bond, which is typically selected from:

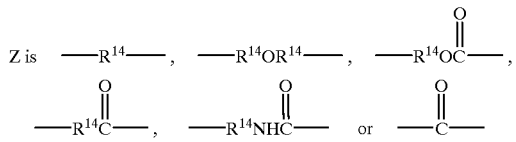

wherein $R^{14}$ is selected from hydrocarbon groups containing 1 to 20 carbon atoms, and wherein $R^{14}$ may be either the same or different from each other when two or more $R^{14}$ are present.

Among those described above, Z is preferably methylene group.

The polyether containing the group having ethylenic double bond represented by formula (b) may be produced by introducing the ethylenic double bound to the side chain of the polyether by any of the conventional methods, for example, by the method disclosed in JP-A 54-6097, or by copolymerizing an epoxy compound such as ethylene oxide or propylene oxide with an olefin group-containing epoxy compound such as allyl glycidyl ether.

Exemplary catalysts for the addition reaction between the silane compound of formula (a) and the polyether containing the group of formula (b) include platinum-based compounds such as platinum black, chloroplatinic acid, platinum alcohol compound, platinum olefin complex, platinum aldehyde complex, and platinum ketone complex.

Furthermore, after the addition reaction, a part or all of the X in the formula (a) may be optionally converted into other hydrolyzable group or hydroxyl group. For example, when X is a halogen atom or hydrogen atom, X is preferably converted to an alkoxy group, an acyloxy group, an aminoxy group, an alkenyloxy group, or hydroxyl group before the use.

The organic polymer may further comprise a unit containing ethylenic double bond derived from a polymerizable compound in addition to the group (b). Exemplary such polymerizable compounds include ethylene, propylene, isobutylene, butadiene, chloroprene, vinyl chloride, vinylidene chloride, acrylic acid, methacrylic acid, vinyl acetate, acrylonitrile, pyridine, styrene, chlorostyrene, 2-methylstyrene, divinylbenzene, methyl acrylate, ethyl acrylate, isobutyl acrylate, 2-ethylhexyl acrylate, 2-hydroxyethyl acrylate, benzyl acrylate, glycidyl acrylate, methyl methacrylate, ethyl methacrylate, isobutyl methacrylate, 2-ethylhexyl methacrylate, 2-hydroxyethyl methacrylate, benzyl methacrylate, glycidyl methacrylate, acrylamide, methacrylamide, n-methylol acrylamide, and silicon-containing compounds as described below.

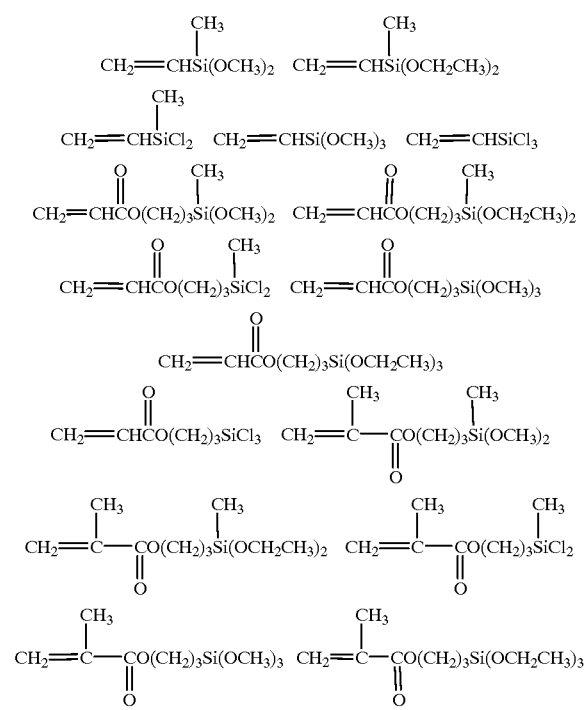

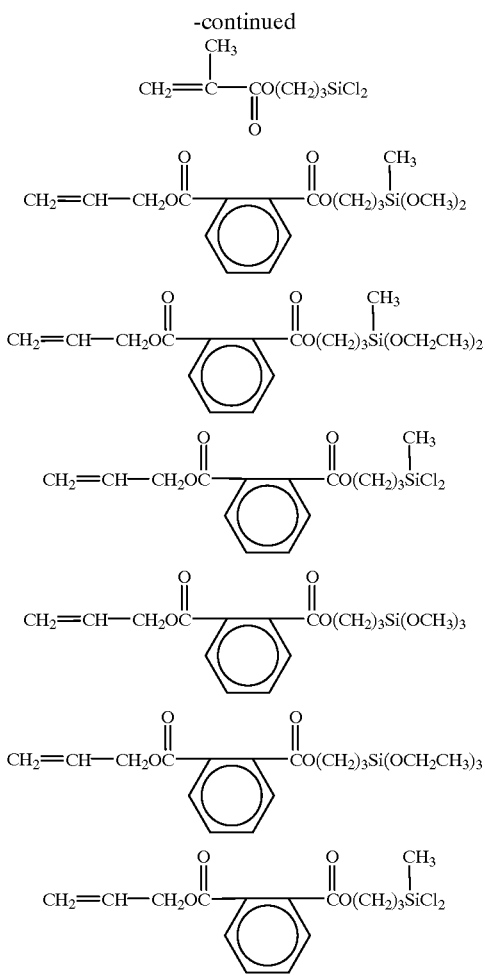

In the preparation of the organic polymer, the silane compound of formula (a), the polyether containing the group of formula (b), and the optional polymerizable compound as described above may be independently selected, and two or more types of compounds may be used in combination for each of these components. The organic polymer containing the optional polymerizable compound may be produced by the method disclosed in JP-A 59-78223, Japanese Patent Application Nos. 59-84848 and 59-84849, and the like, and for example, by polymerizing the optional polymerizable compound in the presence of the addition product of the silane compound of formula (a) and the polyether containing the group of formula (b).

In the preparation of the one-part moisture curable composition, the organic polymer (A) may be used either alone or in combination of two or more such organic polymers (A).

(B) Isocyanate Compound

The isocyanate compound used in the present invention is the one which has a structure wherein at least one isocyanate (NCO) group is present in the molecule and wherein the isocyanate (NCO) group in the molecule has secondary or tertiary carbon bonded thereto. The group other than the NCO group bonding to the secondary or the tertiary carbon is not limited, and such group other than the NCO group is not limited for the number of carbon atoms, bulkiness and may contain hetero atoms such as O, S and N, and the like. The two groups bonding to the tertiary carbon may be either the same or different from each other. Such isocyanate compounds is typically represented by formula (1):

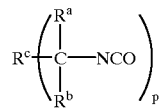

wherein $R_c$ and $R^a$ are independently an organic group which may contain O, S, or N; $R^b$ is hydrogen atom or said organic group; and p is an integer of at least 1.

Exemplary such organic groups include hydrocarbon groups such as an alkyl group, an alicyclic group, an aromatic ring group, an aralkyl group, and an alkylaryl group; and groups containing a hetero atom selected from O, S and N such as ether, carbonyl, amide, urea group (carbamide group), and urethane group-containing groups.

When the bulky group bonded to the isocyanate group containing the secondary or tertiary carbon is an electron-donor group such as an alkyl group, the isocyanate group exhibits reduced reactivity. As a consequence, the isocyanate group is less likely to react with the alcohol produced in the curing of the polymer (A) containing the reactive silyl group, and the resulting composition is free from the curing failures associated with the versatile isocyanate compound such as TDI and MDI.

In the formula as described above, the organic group represented by $R^a$ or $R^b$ is preferably methyl group.

p is preferably an integer of 2 to more. In other words, the isocyanate compound is preferably a polyfunctional isocyanate compound having two or more NCO groups having the branched carbon atom bonded thereto in one molecule. The monocyanate compound wherein p=1 is generally used as a mixture with a polyisocyanate wherein p is 2 to more. The polyisocyanate may be used alone or in combination of two or more polyisocyanate compounds. Use of a diisocyanate (p=2) as a mixture with a triisocyanate (p=3) is a preferable embodiment.

The isocyanate compound used in the present invention may be any isocyanate compound as long as the isocyanate group has the structure as defined above, and may be an isocyanate monomer or a urethane prepolymer derived from a polyisocyanate monomer and a polyol.

Exemplary isocyanate monomers include monoisocyanate compound (p=1) such as m- or p-isopropenyl-α, α-dimethylbenzoyl isocyanate (TMI manufactured by Mitsui Sci-Tech); and diisocyanate compound (p=2) such as m- or p-tetramethylxylilene diisocyanate (TMXDI) as shown by the formula:

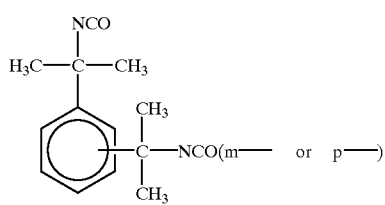

and isophorone diisocyanate.

Of the polyisocyanate monomers as described above, a diisocyanate is generally used for the synthesis of a urethane polymer.

The polyol used for synthesizing the urethane polymer is not limited for its molecular weight or skeleton as long as it has two or more hydroxyl groups. Exemplary polyols which may be used in the present invention include low molecular weight polyhydric alcohols, polyether polyols, polyester polyols, polymeric polyols having a backbone comprising carbon-carbon bond, and the like which are commonly used as a polyol.

Exemplary urethane prepolymers include adducts of a diisocyanate and a low molecular weight polyhydric alcohol; and urethane prepolymers derived from a diisocyanate and a polyol such as a polyether polyol and polyester polyol.

Exemplary such low molecular weight polyhydric alcohols include polyhydric alcohols such as ethylene glycol (EG), diethylene glycol, propylene glycol (PG), dipropylene glycol, (1,3- or 1,4-)butanediol, pentanediol, neopentylglycol, hexanediol, cyclohexanedimethanol, glycerin, 1,1,1-trimethylolpropane (TMP), 1,2,5-hexanetriol, and pentaerythritol; and saccharides such as sorbitol.

Among the adducts of such polyhydric alcohol and a diisocyanate, the preferred is an adduct wherein trimethylolpropane (TMP) is used for the polyhydric alcohol (polyol) (the one wherein p=3 in the above formula). Exemplary preferable adduct is TMXDI-TMP adduct derived from 1,1,1-trimethylol propane (TMP) and tetramethylxylene-diisocyanate (TMXDI) as shown below.

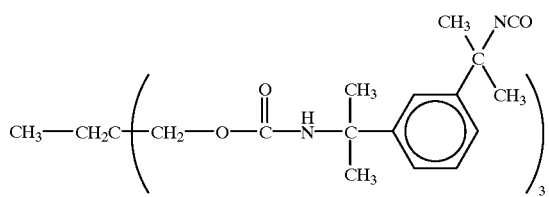

Such adduct is commercially available, for example, under the trade name of Scisen 3160 (Mitsui Sci-Tech). Such adduct is not necessary a perfect OH:NCO adduct and may contain unreacted starting material.

The polyether polyol and the polyester polyol which are used as a polyol in the synthesis of the urethane prepolymer is generally derived from a low molecular weight polyhydric alcohol as described above. In the present invention, use of those derived from an aromatic diol is also preferable. Exemplary aromatic diols include dihydroxystyrene and those having a bisphenol skeleton such as bisphenol A structure (4,4'-dihydroxyphenylpropane), bisphenol F structure (4,4'-dihydroxyphenylmethane), brominated bisphenol A structure, hydrogenated bisphenol A structure, bisphenol S structure, or bisphenol AF structure.

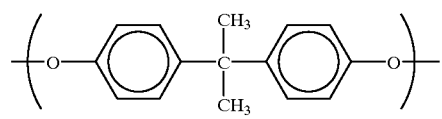
Bisphenol A structure

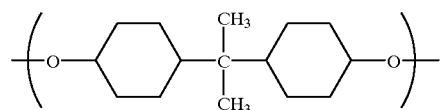
Hydrogenated bisphenol A structure

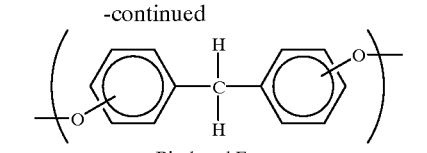
Bisphenol F structure

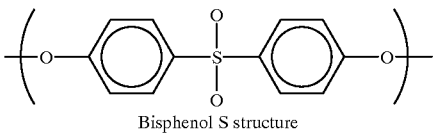
Bisphenol S structure

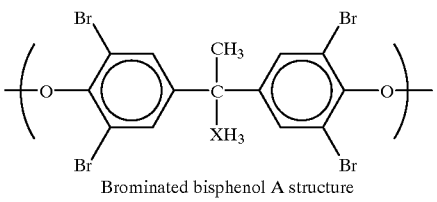
Brominated bisphenol A structure

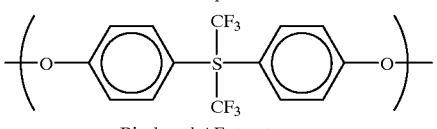
Bisphenol AF structure

Exemplary polyether polyols include those having a unit derived from an alkylene oxide such as ethylene oxide, propylene oxide, butylene oxide, tetramethylene oxide, and styrene oxide and one or more unit selected from bisphenol skeleton or the like. Such polyether polyol can be produced by ring-opening polymerization of a common alkylene oxide, for example, by adding one or more alkylene oxide to the polyhydric alcohol and/or the aromatic diol as described above.

More specific examples of the polyether polyol include polyethylene glycol, polypropylene glycol (PPG), ethylene oxide-propylene oxide copolymer, polytetramethylene ether glycol (PTMEG), sorbitol-based polyol, and the like.

Exemplary polyether polyols having a bisphenol skeleton include a polyether polyol produced from a diol having a bisphenol skeleton and an alkylene oxide such as the polyether polyol containing bisphenol A structure as mentioned above and a unit such as ethylene oxide or propylene oxide.

The polyester polyol may be a condensate (condensed polyester polyol) of one or more of polyhydric alcohols and/or aromatic diols as described above and one or more of polybasic carboxylic acid, lactone polyol, polycarbonate diol, and the like. The polybasic carboxylic acid used for forming the condensed polyester polyol include glutaric acid, adipic acid, azelaic acid, pimelic acid, suberic acid, sebasic acid, terephthalic acid, isophthalic acid, dimeric acid, and other low molecular weight carboxylic acids; oligomeric acid; a hydroxy carboxylic acid derivatives such as castor oil; reaction product of castor oil with ethylene glycol, and the like. Exemplary lactone polyols include those prepared by ring-opening polymerization of propionlactone, valerolactone, and the like.

Exemplary polyester polyols having a bisphenol skeleton include condensed polyester polyols produced by totally or partly replacing the polyhydric alcohol with a diol having a bisphenol skeleton in the procedure as described above, for example, a polyester polyol produced from bisphenol A and castor oil, and a polyester polyol produced from bisphenol A, castor oil, ethylene glycol, and propylene glycol.

Polymer polyols having carbon-carbon bond in their backbone such as acryl polyol, polybutadiene polyol, hydrogenated polybutadiene polyol, and the like are also useful in the synthesis of the urethane prepolymer. The polyols as described above may be used in combination of two or more.

Typical preferable urethane prepolymers are polyfunctional urehtane prepolymers produced by using, for example, a bifunctional or trifunctional polyol or a mixture thereof with a polyfunctional (OH) polypropylene glycol as a polyol. Preferred is the urethane prepolymer obtained by using a polyol having a molecular weight of 1000 to 10000.

Use of a urethane prepolymer having a bisphenol skeleton, and in particular, use of a urethane prepolymer having bisphenol A skeleton is also preferable. Exemplary such urethane prepolymers are those produced by using a polyester polyol synthesized from bisphenol A and castor oil, a polyether polyol synthesized from bisphenol A, ethylene oxide and propylene oxide for the polyol.

The urethane prepolymer may contain two or more polyol components. For example, urethane prepolymer may contain two or more polyol components each having different bisphenol skeletons, or a polyol component having a bisphenol skeleton together with another polyol component having different structure.

Proportion in the urethane prepolymer of the part having the bisphenol structure is not particularly limited. The benefit as described above, however, can be realized sufficiently when the urethane prepolymer contains 1 to 50% by mole of the part having the bisphenol structure.

The isocyanate compound (B) as described above used in the present invention has weak intermolecular hydrogen bond due to the steric hindrance by the secondary or tertiary carbon bonding to the isocyanate group, and therefore, appropriate viscosity and modulus are realized without using any plasticizer. The composition, of course, may include a plasticizer as desired.

In the present invention, the isocyanate compound (B) as described above is used with the organic polymer (A) having the reactive silyl group and the latent curing agent (C) to produce the one-part moisture curable composition, and the excellent storage stability of the one-part moisture curable composition is realized by the particular structure of the isocyanate compound (B) as described above.

Of the isocyanate compounds (B) as described above for use in the present invention, use of the urethane prepolymer is preferable, and use of the urethane prepolymer obtained by using the polyether polyol for the polyol component is most preferable in view of its versatility.

When the urethane prepolymer having a bisphenol skeleton as described above is used for the isocyanate compound (B), the resulting composition will exhibit improved adhesion to mortar and the like without adding any tackifier such as epoxy resin. As a consequence, the composition after curing will retain excellent flexibility inherent to the urethane-based resin compositions.

In the preparation of the one-part moisture curable composition, the isocyanate compound (B) as described above may be used in combination of two or more.

Further more, the isocyanate compound (B) of the present invention may be used with a small amount of other isocyanate compounds commonly used in the art as long as the benefits of the present invention are not impaired. For example, an isocyanate compound of the type used as the main component of the two-part curable composition which has a group that does not sterically hinder the isocyanate group may be employed in the present invention. Use of such isocyanate compound, however, should be limited to an amount of less than 10% by mole of the isocyanate compound (B) since such isocyanate compound adversely affects the storage stability of the composition.

(C) Latent Curing Agent

In the present invention, a water-hydrolyzable latent curing agent such as ketimine is used for the latent curing agent. The most preferred is a ketimine having the particular structure as described below. It should be noted that, in the present invention, a compound having a C=N bond derived from a ketone or an aldehyde and an amine is referred to as a ketimine. Therefore, the term ketimine used herein includes an aldimine having —HC=N bond within its definition.

The ketimine used in the present invention has ketimine (C=N) bond derived from a ketone or an aldehyde and an amine, and has a structure wherein a branched carbon or a ring member carbon is bonded to a position of at least one of carbon or nitrogen of the ketimine bond. In other words, the ketimine used in the present invention has a bulky group at α position of the ketimine (C=N) bond. The ring member carbon may be either the carbon atom constituting an aromatic ring or an alicyclic ring.

In the present invention, typical ketimines having such bulky group include:

(i) a ketimine having two or more ketimine (C=N) bonds having the bulky group bonded thereto in one molecule; and (ii) a silicon-containing ketimine having a bulky group derived from a ketone or an aldehyde at the α position of the ketimine carbon, and containing an amine component derived from an aminoalkylalkoxysilane, or its polycondensate.

For introducing the branched carbon or the ring member carbon in the α position of the ketimine carbon in the above (i) and (ii), a ketone or an aldehyde which has a branched hydrocarbon group or a cyclic hydrocarbon group at the α position of the carbonyl group is utilized. Examples of such ketones and aldehydes include diisopropyl ketone, the ketone or the aldehyde having a branched hydrocarbon group represented by the formula (2), below, a ketone and an aldehyde having a cyclic hydrocarbon group such as propiophenone, benzophenone, benzaldehyde, and cyclohexanecarboxyaldehyde. These aldhyde or ketone may be used as combination.

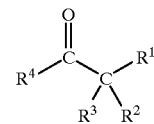

(2)

In formula (2), $R^1$ is a $C_{1-6}$ alkyl group; $R^2$ is methyl group or ethyl group; $R^3$ is hydrogen atom, methyl group, or ethyl group; and $R^4$ is hydrogen atom or methyl group.

Exemplary ketones and aldehydes represented by formula (2), above include methyl t-butylketone (MTBK), methyl isopropylketone (MIBK), pivalic aldehyde (trimethylacetoaldehyde), isobutylaldehyde wherein the carbonyl group has branched carbon bonded thereto ((CH$_3$)$_2$CHCHO).

Among these, the preferred is the compound represented by formula (2).

The ketimine (i) has two or more C=N bonds in one molecule. Such ketimine is generally produced by using a polyamine having two or more amino groups in one molecule. In the case of the ketimine wherein a bulky group is introduced at α position of the ketimine nitrogen as described above, the ketimine may be produced by using a polyamine such as 2,5-dimethyl-2,5- hexamethylenediamine, menthene diamine, 1,4-bis(2-aminomethyl-2-methylpropyl)piperadine, polypropylene glycol (PPG) wherein propylene branched carbons at opposite ends of the molecule has amino group bonded thereto (Jeffamine D230 and Jeffamine D400 manufactured by Sun Technochemical).

Of the ketimines (i), use of a ketimine wherein the ketimine carbon has a bulky group bonded thereto and the ketimine nitrogen has methylene thereto is preferable since the resulting one-part curable composition will exhibit both good storage stability and curability (curing rate) when used with the isocyanate compound (B) of the particular structure as described above.

Methylene group may be introduced in the ketimine nitrogen by using the polyamine represented by the formula (3):

(3)

Exemplary polyamines represented by the formula (3) include ethylenediamine, propylenediamine, butylenediamine, diethylenetriamine, triethylenetetramine, tetraethylenepentamine, pentaethylenehexamine, hexamethylenediamine, trimethylhexamethylenediamine, N-aminoethylpiperadine, 1,2-diaminopropane, iminobispropylamine, methyliminobispropylamine, diamine having polyether skeleton wherein amine nitrogen has methylene group bonded thereto, for example, $H_2N(CH_2CH_2O)_2(CH_2)_2NH_2$ (trade name, Jeffamine EDR184, manufactured by Sun Technochemical), 1,5-diamino-2-methylpentan (trade name, MPMD, manufactured by DuPont Japan), metaxylenediamine (MXDA), polyamideamine (X2000, manufactured by Sanwa Chemical), isophoronediamine, 1,3-bisaminomethylcyclohexane (1,3BAC, manufactured by Mitsubishi Gas Chemical), 1-cyclohexylamino-3-aminopropane, 3-aminomethyl-3,3,5-trimethyl-cyclohexylamine, a diamine having norbornane skeleton (NBDA, manufactured by Mitsui Chemical).

Among these, the preferred are 1,3-bisaminomethylcyclohexane (1,3BAC), norbornane diamine (NBDA), metaxylylenediamine (MXDA), Jeffamine EDR184 (trade name), and polyamideamine.

Preferable examples of the ketimine (i) are:
ketimines produced from methyl isopropyl ketone (MIPK) or methyl t-butyl ketone (MTBK) and Jeffamine EDR148 (trade name, a dimethyleneamine having polyether skeleton);
ketimines produced from methyl isopropyl ketone (MIPK) or methyl t-butyl ketone (MTBK) and 1,3-bisaminomethylcyclohexane (1,3BAC);
ketimines produced from methyl isopropyl ketone (MIPK) or methyl t-butyl ketone (MTBK) and a dimethyleneamine having norbornane skeleton (tradename, NBDA);
ketimines produced from methyl isopropyl ketone (MIPK) or methyl t-butyl ketone (MTBK) and metaxylylenediamine (MXDA); and
ketimines produced from methyl isopropyl ketone (MIPK) or methyl t-butyl ketone (MTBK) and polyamideamine (X2000).

Among these, use of the ketimine produced from MIPK or MTBK and NBDA, and the ketimine produced from MIPK and 1,3BAC results in the improved curability of the resulting composition.

Use of the ketimine produced from MIPK or MTBK and X2000 results in the improved adhesion to wet surface of the resulting composition.

Preferable aldimines are those produced from the combination of pivalic aldehyde and norbornane diamine (NBDA), 1,3-bisaminomethylcyclohexane (1,3BAC), Jeffamine EDR148 or metaxylylene diamine (MXDA); the combination of isobutyl aldehyde and norbornane diamine (NBDA), 1,3-bisaminomethylcyclohexane (1,3BAC), Jeffamine EDR148 or metaxylylene diamine (MXDA); and the combination of cyclohexane carboxy aldehyde and norbornane diamine (NBDA), 1,3-bisaminomethylcyclohexane (1,3BAC), Jeffamine EDR148 or metaxylylene diamine (MXDA).

The ketimine (i) as described above may be produced by reacting the ketone or the aldehyde and the polyamine through heating under reflux in the absence of the solvent or in the presence of benzene, toluene, xylene or other solvent, and azeotropically removing the separated water.

Ketimine (ii) is a silicon-containing ketimine derived from the aminoalkoxysilane represented by formula (4), below. This ketimine, has a bulky group derived from the ketone or the aldehyde at the α position of the ketimine carbon, and the situation of this part is similar to the case of the ketimine (i).

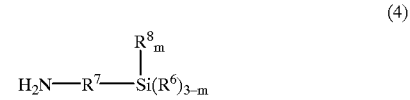

(4)

In formula (4), $R^6$ is $C_{1-6}$ alkyl group, $C_{1-6}$ alkoxy group, or a monovalent siloxane derivative. Exemplary $C_{1-6}$ alkyl groups include methyl group, ethyl group, propyl group, etc.; exemplary $C_{1-6}$ alkoxy groups include methoxy group, ethoxy group, propoxy group, etc.; and exemplary monovalent siloxane derivatives include silyloxy group. Among these, the preferred are methoxy and ethoxy groups.

$R^7$ is a divalent hydrocarbon group preferably containing 1 to 6 carbon atoms. $R^7$ may contain nitrogen atom. Exemplary divalent nitrogen-free hydrocarbon groups include methylene group, ethylene group, propylene group, etc.; and exemplary nitrogen-containing divalent hydrocarbon groups include those mentioned for the nitrogen-free hydrocarbon groups having a secondary amino group in their hydrocarbon group. Among these, it is preferred that the amino group in formula (4) has methylene group bonded thereto, and propylene group and $-C_2H_4NHC_3H_6-$ group are also preferred.

$R^8$ is an alkoxy preferably containing 1 to 6 carbon atoms, and more preferably, methoxy group or ethoxy group.

m is 1, 2 or 3.

Typical aminoalkoxysilanes represented by the formula (4) are the compounds of formulae (5) to (12), below. Among these, the preferred are the compounds of formulae (5) to (8). The compounds of formulae (5) to (8) are the compounds known as universal silane coupling agents.

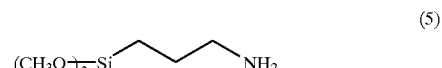

(5)

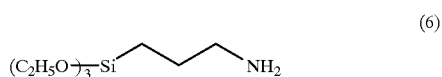

(6)

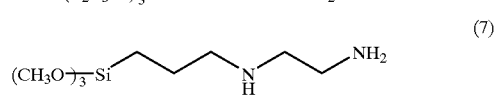

(7)

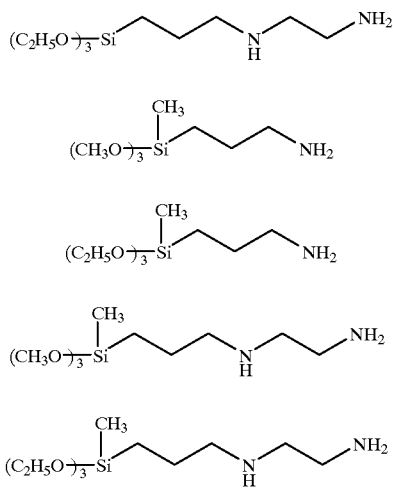

(8)

(9)

(10)

(11)

(12)

The aminoalkoxysilanes as described above is capable of readily forming the ketimine bond with the ketone or the aldehyde having a bulky group at the α position of the carbonyl group, and the silicon-containing ketimine produced by using such aminoalkoxysilane is particularly preferable since such silicon-containing ketimine has high hydrolyzability and curability as well as sufficient storage stability.

The ketimine (ii) is produced from the aminoalkoxysilane and the ketone or the aldehyde having a bulky group as described above through dehydration. More illustratively, ketimine (ii) is produced by mixing the aminoalkoxysilane with an equal molar amount of the ketone or the aldehyde, or with an excessive amount of the ketone or the aldehyde (generally more than 1.2 equivalents of the ketone or the aldehyde in relation to the amino group), and stirring the mixture under heating at a temperature higher than room temperature. The reaction temperature is typically 0 to 150° C., and preferably 20 to 110° C. The reaction period is 2 to 72 hours, and preferably 2 to 48 hours. The thus produced silicon-containing ketimine is represented by formula (13):

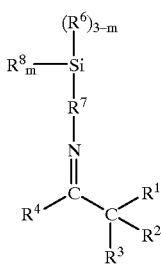

(13)

In formula (13), $R^1$ to $R^4$ are as defined above for the formula (2); and $R^6$, $R^7$ $R^8$, and m are as defined above for the formula (4).

Alternatively, the ketimine (ii) may be a polycondensate of the silicon-containing ketimine as described above. Such polycondensate is formed by polymerization the alkoxysilyl group formed by hydrolysis of the silicon-containing ketimine of formula (13) by the water separated in the dehydration reaction between the aminoalkoxysilane and the ketone or the aldehyde. The polycondensate of the silicon-containing ketimine has a backbone of the structure as represented by formula (14):

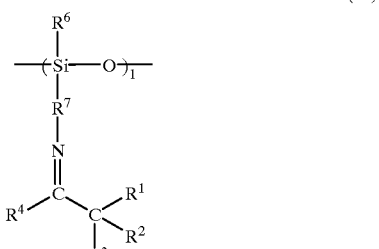

(14)

In formula, $R^1$ to $R^4$, $R^6$ and $R^7$ are as defined above for the formula (13); and l is an integer of at least 1, and preferably an integer of 1 to 50.

The backbone of the thus produced silicon-containing polymer may have at its terminals hydrogen atom; a $C_{1-6}$ alkyl group such as methyl group, ethyl group, or propyl group; a $C_{1-6}$ alkoxy group such as methoxy group, ethoxy group, or propoxy group; or a monovalent siloxane derivative such as silyloxy group.

The production of the silicon-containing ketimine (ii) by the reaction of the aminoalkoxysilane and the ketone or the aldehyde may be conducted in the co-presence of an alkoxysilane having no amino group. (The amino group-free alkoxysilane is hereinafter referred to as a silane coupling agent for the convenience of the description).

The silane coupling agent used may be any of the silane coupling agents known in the art, and typical silane coupling agents are epoxy-containing alkoxy silanes.

The epoxy-containing alkoxy silane is preferably a compound which has epoxy group and a hydrolyzable alkoxysilyl group on opposite terminals of the molecule. The backbone of the epoxy-containing alkoxy is an organic group which is mainly constituted from a hydrocarbon group such as methylene, ethylene, or the like and which also typically contains a group including O, S, or N.

The hydrolyzable alkoxysilyl group is a reactive silicon-based group wherein an alkoxy group such as methoxy group or ethoxy group is bonded to the silicon atom. The hydrolyzable alkoxysilyl group may also contain hydrogen atom or an alkyl group such as methyl group, ethyl group, or the like bonded to the silicon atom. Use of methoxy group for the alkoxy group is preferable in view of mild hydlyzability and favorable handling convenience.

Among such epoxy-containing alkoxy silanes, the preferred is γ- (or 3-) glycydoxypropyltrimethoxysilane as shown below:

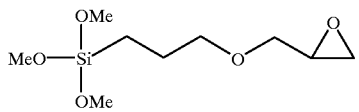

Also, the silane coupling agent may be the one containing no epoxy group. Exemplary such silane coupling agents include chloropropyltrimethoxy silane, vinyltrichlorosilane, trimethoxyvinylsilane, vinyltriethoxysilane, vinyltris (2-methoxyethoxy)silane, and γ-methacryloxypropyltrimethoxysilane. Among these use of trimethoxyvinylsilane is preferred.

Use of such silane coupling agent is favorable in view of their excellent ability in improving the adhesion to wet surface and their general versatility.

It should be noted that, in the present invention, such silane coupling agent may be added in the synthesis of the ketimine (ii), or to the isocyanate (B) and the ketimine (C) in the production of the one-part curable composition. In either case, the amount of the silane coupling agent added is not particularly limited. The amount of the silane coupling agent, however, is preferably up to 5 molar amount, and more preferably, up to 2 molar amount of the aminoalkoxysilane in view of the physical properties of the cured product.

The reaction conditions employed in the synthesis of the ketimine in the presence of the silane coupling agent as described above are the same as those employed in the absence of the silane coupling agent. After completion of the reaction, excess ketone or aldehyde and the alcohol generated are removed under reduced pressure to leave the desired product.

It is estimated that, in the reaction in the presence of the coupling agent, the silicon-containing ketimine is first generated through dehydration in the reaction between the aminoalkoxysilane and the ketone or the aldehyde, and then, the alkoxysilyl group in the silicon-containing ketimine and the alkoxysilyl group in the silane coupling agent react with each other after their hydrolysis by the separated water. Therefore, when an epoxy group-containing alkoxysilane is used for the silane coupling agent, the epoxy resin remains unreacted in the reaction product together with the ketimine bond, and the resulting ketimine will contain epoxy group and alkoxysilyl group in the molecule as well as the ketimine bond.

These groups can coexist during the storage, and in the use, the presence of the epoxy group and the alkoxysilyl group in addition to the ketimine bond enables curing at a higher rate.

Typical ketimines (ii) produced by using such silicone coupling agent (epoxy-containing alkoxysilane) are represented by formula (15):

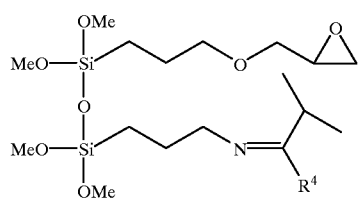

(15)

wherein $R^4$ is hydrogen or methyl group.

As described for the ketimines (i) and (ii), the ketimine used in the present invention has a structure wherein a bulky group is present at the α position of the ketimine bond, and the nitrogen is sterically hindered by such bulky group.

In the case of the conventional known ketimines produced from ketone such as methyl isobutyl ketone (MIBK), methylethylketone (MEK) and an amine having methylene group bonded to the amino group, the ketimine exhibited strong basicity since amine nitrogen is left uncovered. Therefore, the one-part composition produced by blending such ketimine with the isocyanate compound suffered from insufficient storage stability and such composition often gelated during the storage.

In contrast, the ketimine used in the present invention has a bulky group near the ketimine nitrogen or a bulky group directly bonding to the ketimine nitrogen, and the ketimine nitrogen is protected by the substituent. As a consequence, the basicity of the ketimine is significantly weakened by the steric hindrance, and excellent stability is thereby realized. In addition, the ketimine nitrogen of the ketimine used in the present invention easily turns into active amine upon contact with the moisture in air in the use of the curable composition, and the composition exhibits excellent curability. Therefore, use of the ketimine as described above for the latent curing agent (C) together with the organic polymer (A) containing the reactive silyl group and the isocyanate compound (B) of particular structure as described above will enable production of a one-part moisture curable composition which is curable at room temperature and which has high storage stability.

It should be noted that, even when the ketimine as described above is used for the latent curing agent, the resulting composition does not exhibit sufficient storage stability despite the high curing rate when the isocyanate compound used is an isocyanate group such as TDI (tolylene diisocyanate), xylene diisocyanate (XDI), MDI or the like free from the bulky group near the isocyanate group. Accordingly, production of a one-part moisture curable composition with practical utility has been difficult.

When such ketimine is brought in contact with air, the ketimine nitrogen is easily attacked by the small-sized water molecule of the moisture since such small-sized molecule is not sterically hindered by the substituent. The attacked ketimine nitrogen rapidly undergoes hydrolysis, and the ketimine functions as the curing agent.

The one-part moisture curable composition of the present invention produced from the organic polymer (A) containing the reactive silyl group, the isocyanate compound (B) of particular structure, and the latent curing agent (C) as described above exhibits excellent storage stability, and when brought in contact with air, cures at room temperature to exhibit good adhesion.

In the production of the one-part moisture curable composition from the organic polymer (A) containing the reactive silyl group, the isocyanate compound (B), and the latent curing agent (C) as described above, the components (A) and (B) may be used at an adequate mixing ratio depending on the desired physical properties of the final product, for example, in the range of the (A)/(B) weight ratio of from 1/99 to 99/1. The latent curing agent (C) is preferably used in relation to the isocyanate compound (B) such that equivalent ratio of the functional groups in these components (isocyanate group in the isocyanate compound (B)/ketimine bond C=N in (C)) is in the range of 0.1 to 2.0, and the equivalent ratio is more preferably in the range of 0.5 to 1.5. When the components are used at such ratio, the resulting composition exhibits both sufficient storage stability and excellent curability.

The composition of the present invention may also contain a silanol condensation catalyst (curing catalyst) although use of such catalyst is optional. Exemplary such silanol condensation catalysts include metal carboxylates such as dibutyl tin dilaulate, dibutyl tin phthalate, dibutyl tin maleate, dibutyl tin diacetate, tin octylate, tin larate, tin naphthenate, tin Versaticate, titanium naphthenate, etc.; titanic acid ester such as tetrabutyl titanate, tetraisopropyl titanate, triethanolamine titanate, etc.; reaction product of dibutyl tin oxide and a phthalate; dibutyl tin diacetylacetonate; organoaluminum compounds such as aluminum trisacetylacetonate, aluminum trisethylacetonate, diisopropoxy aluminum ethylacetoacetate, etc.; chelate compounds such as zirconium tetraacetylacetonate, titanium tetraacetylacetonate etc.; lead octylate; iron naphthenate; bismuth compounds such as bismuth-tris(neodecanoate) and bismuth-tris(2-ethylhexoate) ; and the like, which may be used either alone or in combination of two or more.

When the curing catalyst is contained, the curing catalyst is typically used in an amount of 0.1–20 parts by weight per 100 parts by weight of the organic copolymer (A).

The one-part moisture curable composition of the present invention may contain optional components other than the components (A), (B) and (C) as described above in an amount that does not adversely affects the merit of the invention.

An exemplary such optional component is the silane coupling agent as described above. Inclusion in the one-part moisture curable composition of the silane coupling agent will improve adhesion of the composition to a wet surface as well as storage stability and curing rate of the composition.

Among such silane coupling agents, the preferred are trimethoxyvinylsilane and γ-glycidoxypropyltrimethoxysilane in view of their excellent ability of improving the wet surface adhesion and their general versatility.

The silane coupling agent may be used in the synthesis of the ketimine (ii) as described above. However, when the silane coupling agent is used in the blending of the components (B) and (C), the silane coupling agent is preferably used in an amount of 0.1 to 20 part by weight, and more preferably in an amount of 0.5 to 10 parts by weight per 100 parts by weight of the isocyanate compound (B). Use of the silane coupling agent in such an amount will result in an improved adhesion to wet surface of the composition, and more illustratively, the composition after curing will exhibit high shear stress at break as well as percentage of matrix failure (adherent) of almost 100%.

The one-part moisture curable composition of the present invention may optionally contain calcium carbonate. In particular, addition of a surface-treated calcium carbonate is beneficial for realizing desired viscosity, good initial thixotropy and storage stability.

Exemplary such calcium carbonate products include conventional known surface-treated calcium carbonate such as calcium carbonate surface treated with a fatty acid, a resinous acid, or a fatty acid ester, and those described in Japanese Patent Application No. 8-76962. Typical calcium carbonate products surface treated with a fatty acid include Calfine 200 (manufactured by Maruo Calcium K.K.) and White-in 305 (heavy calcium carbonate, manufactured by Shiraishi Calcium). A typical calcium carbonate products surface treated with a fatty acid include Sealet 200 (manufactured Maruo Calcium).

Calcium carbonate is preferably used in an amount of 30 to 200 parts by weight, and more preferably, in an amount of 50 to 150 parts by weight per 100 parts by weight of isocyanate compound (B) in order to realize an adequate initial thixotropy and sufficient workability. Calcium carbonate in excess of 200 parts by weight is likely to invite excessive increase in viscosity to detract from workability.

The one-part moisture curable composition of the present invention may also contain an epoxy resin. The type of the epoxy resin contained is not particularly limited as long as the epoxy resin used is a polyepoxy compound containing two or more epoxy groups in one molecule. Exemplary such epoxy resins include glycidyl ether epoxy resins of bisphenol A and derivatives thereof; glycidyl ether epoxy resins of glycerin; glycidyl ether epoxy resins of polyalkylene oxide; glycidyl ether epoxy resins of phenol novolac; glycidyl ether epoxy resins of dimeric acid; and glycidyl ether epoxy resins of bisphenol F.

Among these, the preferred is glycidyl ether epoxy resin of bisphenol A.

Inclusion of the epoxy resin may enable increase in the cure rate of the one-part moisture curable composition as well as increase in the adhesion.

In the present invention, properties inherent to urethane cured products such as flexibility, compressibility, high tensile strength, and the like are retained even when the epoxy resin is included in the composition in an amount more than the isocyanate compound (B). The amount of the epoxy resin added may be determined as required by taking the curing rate of the resulting composition; hardness, strength, and tensile strength of the cured product; and the like into consideration.

In addition, the one-part moisture curable composition of the present invention may optionally include a filler, a plasticizer, a thixotropic agent, a pigment, a dye, an antiaging agent, an antioxidant, an antistat, a flame retardant, a tackifier, a dispersant, a solvent, and the like.

The filler used may be an organic or an inorganic filler of any configuration. Exemplary fillers include fumed silica, calcined silica, precipitated silica, pulverized silica, fused silica; diatomaceous earth; iron oxide, zinc oxide, titanium oxide, barium oxide, magnesium oxide; calcium carbonate, magnesium carbonate, zinc carbonate; talc clay, kaolin clay, calcined clay; carbon black; and any of the foregoing treated with a fatty acid, resinous acid, and fatty acid ester.

The plasticizer used may be dioctyl phthalate (DOP), dibutyl phthalate (DBP), dioctyl adipate, isodecyl succinate, diethylene glycol dibenzoate, pentaerythritol ester; butyl oleate, methylacetyl ricinoleate; tricresyl phosphate; trioctyl phosphate; adipic propylene glycol polyester, adipic butyleneglycolpolyester; and the like.

The thixotropic agent used may be Aerosil (manufactured by Japan Aerosil K.K.), Disparon (manufactured by Kusumoto Kasei K.K.) or the like; and the antistatic agent may be quaternary ammonium salt, or a hydrophilic compound such as polyglycol, an ethylene oxide derivative, or the like.

The pigment used may be either an inorganic or an organic pigment or the both. Exemplary pigments include inorganic pigments such as titanium oxide, zinc oxide, ultramarine, red oxide, lithopon, lead, cadmium, iron, cobalt, aluminum, chlorinate, sulfate, and the like; and organic pigments such as azo pigments and copper phthalocyanine pigments.

A typical antiaging agent which may be used is a hindered phenol compound.

The antioxidant used may be butylhydroxytoluene (BHT), butylhydroxyanisole (BHA), or the like.

The flame retardant used may be any of chloroalkylphosphates, dimethyl methylphosphonate, bromine and phosphor compounds, ammonium polyphosphate, neopentylbromide-polyether, brominated polyether, and the like.

The tackifier used may be terpene resin, phenol resin, terpene-phenol resin, rosin resin, xylene resin, or the like.

The additive components as described above may be used in an appropriate combination.

The method for producing the one-part moisture curable composition from the components as described above is not particularly limited. The composition, however, is preferably produced by thoroughly kneading and uniformly dispersing the components as described above in a mixer or other agitating means under reduced pressure or in an inert atmosphere such as nitrogen.

The resulting one-part moisture curable composition may be stored in a sealed container until its use whereupon the composition may be taken out of the sealed container for curing by the moisture in air at normal temperature.

The cured product obtained from the one-part moisture curable composition exhibits good adhesion and excellent rubber elasticity as well as high strength. Therefore, the one-part moisture curable composition of the present invention is useful as a sealant, adhesive, tackifier, coating composition, moulage material, casting rubber material, foaming material, and the like.

The present invention is further described by referring to the Examples which by no means limit the scope of the invention.

EXAMPLES

Synthesis Example 1:

Synthesis of Ketimine A 100 g of a diamine having norbornane skeleton as shown below (NBDA, manufactured by Mitsui Chemical, Inc.) as an amine and 200 g of methyl isopropyl ketone (MIPK) corresponding to 1.5 equivalent of the amine were added to a flask with 200 g of toluene. The water generated was azeotropically removed and the reaction was continued for 20 hours to obtain ketimine A (a yellow transparent liquid; yield, 211 g; percent yield, 96%).

NBDA

Synthesis Example 2:

Synthesis of Ketimine B

The procedure of Synthesis Example 1 was repeated except that 100 g of m-xylylenediamine (MXDA, manufactured by Mitsubishi Gas Chemical Company, Inc.) as an amine and 216 9 of methyl t-butyl ketone (MTBK) were used. After 20 hours, there was obtained ketimine B (a yellow transparent liquid; yield, 184 g; percent yield, 98%).

Synthesis Example 3:

Synthesis of Urethane Polymer (1)

Tetramethylxylene diisocyanate (TMXDI, manufactured by Mitsui Sci-Tech) and trifunctional polypropylene glycol (PPG) (Exenol 5030, manufactured by Asahi Glass Co., Ltd., molecular weight, 5000) as a polyol were mixed at a molar ratio of NCO/OH of 2.0, and the reaction was allowed to take place in the presence of a tin catalyst at 80° C. for 8 hours with stirring to produce urethane prepolymer (1).

Comparative Synthesis Example 1:

Synthesis of Urethane Polymer (2)

The procedure of the above-described synthesis of urethane polymer (1) was repeated except that tetramethyexylene dusocyanate (TMXDI) was replaced with TDI (tolylene dlsocyanate) to produce urethane prepolymer (2).

Examples 1 to 4

Compositions produced by mixing the components shown in Table 1 at the mixing ratio shown in Table 1 were evaluated for their storage stability (percentage of viscosity increase), curability (tack free time), elongation of the cured product, and tensile strength as described below. The results are shown in Table 1.

<Viscosity Increase>

The components (B) and (D) were mixed in a sealed container and stored at 20° C. for one day, and then at 70° C. for another one day. The viscosity value after the two day storage was divided by the viscosity value after one day storage at 20° C.

<Curability>

The components were mixed in a sealed container and the mixture was kept under the conditions of 20° C. and humidity of 55% for one week. The curability was evaluated by attaching a polyethylene film to the surface of the composition. The tack-free sample is indicated by ○, and the tacky sample is indicated by X.

<Elongation and Tensile Strength of the Sheet>

The resin compositions were allowed to cure at 20° C. and at a RH of 55% for 10 days, and a dumbbell-shaped No. 2 test specimen defined in JIS K6251 was stamped from the cured sheet. The test specimen was stretched at a tensile speed of 200 mm/min to measure the elongation at break and the tensile strength.

Comparative Examples 1 to 3

Compositions were produced by using the components shown in Table 1 at the mixing ratio as shown in Table 1. The compositions were evaluated as described above in the Examples. The results are also shown in Table 1.

TABLE 1

|  | Examples | | | | Comparative Examples | | |
|---|---|---|---|---|---|---|---|
|  | 1 | 2 | 3 | 4 | 1 | 2 | 3 |
| (A) Organic polymer[*1] | 75 | 25 | 25 | 25 | 100 | 75 | 75 |
| (B) Urethane Polymer (1) | 25 | 75 | 75 | 75 |  |  |  |
| Urethane polymer (2) |  |  |  |  |  | 25 | 25 |
| (C) Ketimine A | 1.7 | 5.1 | 5.1 |  |  |  | 1.7 |
| Ketimine B |  |  |  | 5.1 |  |  |  |
| Tin catalyst[*2] | 0.3 | 0.1 |  | 0.1 | 1.0 | 0.3 | 0.3 |
| Viscosity increase | 1.3 | 1.3 | 1.3 | 1.3 | 1.5 | 1.3 | 20 |
| Curablity | ○ | ○ | ○ | ○ | ○ | X | ○ |
| Elongation (%) | 400 | 890 | 710 | 890 | 320 | — | 400 |
| Tensile strength (MPa) | 1.1 | 2.7 | 1.2 | 2.7 | 0.4 | — | 1.1 |

The composition is indicated in parts by weight.

*1) Modified silicone resin S303 (backbone: PPG, methyldimethoxysilyl terminal) (manufactured by Kanegafuchi Chemical Industry, nominal molecular weight, 7000).

*2) dibutyl tin laurate

INDUSTRIAL APPLICABILITY OF THE INVENTION

As demonstrated above, the one-part moisture curable composition according to the present invention has an excellent storage stability, high curing rate and good adhesion, and the cured product exhibits excellent rubber elasticity as well as high strength.

The one-part moisture curable composition of the present invention is useful as an adhesive or a sealant of concrete, wood, metal and the like, and also, as a tackifier, coating composition, moulage material, casting rubber material, foaming material, and the like.

What is claimed is:

1. A one-part moisture curable composition comprising:
   (A) an organic polymer having at least one reactive silyl group in the molecule, (B) an isocyanate compound having at least one isocyanate (NCO) group bonded to secondary or tertiary carbon in the molecule, and (C) a latent curing agent.

2. The one-part moisture curable composition according to claim 1 wherein said latent curing agent (C) is a ketimine having ketimine (C=N) bond derived from a ketone or an aldehyde and an amine having a structure wherein a branched carbon atom or a ring member carbon atom is bonded to α position of at least one of carbon or nitrogen of the ketimine bond.

* * * * *